(12) United States Patent
Hubert et al.

(10) Patent No.: US 11,438,726 B2
(45) Date of Patent: Sep. 6, 2022

(54) METHOD AND SYSTEM FOR GEOLOCATING A TERMINAL IN RANGE OF A TRANSMITTING DEVICE OF INTEREST

(71) Applicant: SIGFOX, Labege (FR)

(72) Inventors: Loïc Hubert, Saint-Sulpice-sur-Lèze (FR); Robert Chevallier, Boulogne Billancourt (FR); Philippe Garnier, Epagny (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 17/262,407

(22) PCT Filed: Jul. 19, 2019

(86) PCT No.: PCT/EP2019/069514
§ 371 (c)(1),
(2) Date: Jan. 22, 2021

(87) PCT Pub. No.: WO2020/020776
PCT Pub. Date: Jan. 30, 2020

(65) Prior Publication Data
US 2021/0314726 A1 Oct. 7, 2021

(30) Foreign Application Priority Data
Jul. 24, 2018 (FR) ..................... 18 56863

(51) Int. Cl.
*H04W 4/021* (2018.01)
*G01S 5/00* (2006.01)
(Continued)

(52) U.S. Cl.
CPC .......... *H04W 4/021* (2013.01); *G01S 5/0036* (2013.01); *G01S 5/0226* (2013.01); *G01S 5/0236* (2013.01); *H04W 64/006* (2013.01)

(58) Field of Classification Search
CPC ....... H04W 4/02; H04W 4/021; H04W 4/025; H04W 4/029; H04W 4/33; H04W 64/006;
(Continued)

(56) References Cited

U.S. PATENT DOCUMENTS 8,571,578 B1 * 10/2013 Chen ..................... G01S 5/0009
455/456.1
9,857,162 B1 1/2018 Gum et al.
(Continued)

FOREIGN PATENT DOCUMENTS

| WO | 2014155151 A1 | 10/2014 |
| WO | 2016126847 A1 | 8/2016 |
| WO | 2016196431 A1 | 12/2016 |

*Primary Examiner* — Jean A Gelin
(74) *Attorney, Agent, or Firm* — IPSIDE; C. Andrew Im; Jean-Christophe Hamann

(57) ABSTRACT

A method for geolocating a terminal of a wireless communication system. The terminal receiving a message transmitted by a transmitting device of interest. An ambiguous item of identification information is obtained from the transmitting device of interest. The terminal transmitting to the access network a message including the ambiguous item of identification information from the transmitting device of interest. The access network estimating an approximate geographical position of the terminal. The transmitting device of interest is identified in a table storing a list of transmitting device identifiers and the respective geographical positions of the transmitting devices. The precise geographical position of the terminal is estimated according to the geographical position of said transmitting device of interest.

18 Claims, 2 Drawing Sheets

(51) Int. Cl.
*G01S 5/02* (2010.01)
*H04W 64/00* (2009.01)

(58) Field of Classification Search
CPC .... H04W 84/12; G01S 5/0226; G01S 5/0236; G01S 5/0036
See application file for complete search history.

(56) References Cited

U.S. PATENT DOCUMENTS

| | | |
|---|---|---|
| 10,455,354 B2 * | 10/2019 | Hu .......................... H04W 4/02 |
| 2013/0324154 A1 | 12/2013 | Raghupathy et al. |
| 2014/0341132 A1 * | 11/2014 | Kim ..................... H04W 8/005 |
| | | 370/329 |
| 2019/0043022 A1 * | 2/2019 | Fosmark ................ G06Q 20/02 |
| 2020/0010051 A1 * | 1/2020 | Dumov ................ G06V 40/172 |

* cited by examiner

METHOD AND SYSTEM FOR GEOLOCATING A TERMINAL IN RANGE OF A TRANSMITTING DEVICE OF INTEREST

RELATED APPLICATIONS

This application is a § 371 application of PCT/EP2019/069514 filed Jul. 19, 2019, which claims priority from French Patent Application No. 18 56863 filed Jul. 24, 2018, each of which is incorporated herein by reference in its entirety.

TECHNICAL FIELD

The present invention relates to a method and a system for geolocating a terminal of a wireless communication system.

The invention finds a particularly advantageous application, although in no way limiting, for applications of the M2M (acronym for "Machine-to-Machine") type or of the "Internet of Things" (or IoT) type.

BACKGROUND OF THE INVENTION

There are currently many solutions for obtaining the geographical position of a terminal in an access network of a wireless communication system.

For example, the terminal can embed a GPS ("Global Positioning System") receiver allowing it to determine its geographical position. The terminal can then transmit a message indicating this geographical position to the access network of the wireless communication system.

However, there are also many terminals which are not equipped with such GPS receivers, for which it is nevertheless desired to be able to estimate the geographical position.

It is also known to estimate, at the access network, the geographical position of a terminal based on messages transmitted by said terminal and received by one or more base stations of said access network.

For example, when the same message is received by several base stations of geographical positions known a priori, then the geographical position of said terminal can be estimated, in a known manner, by comparing the strength levels ("Received Signal Strength Indicator» or RSSI) of reception of the message on each of the base stations. However, many parameters (obstacles, multiple paths, etc.) can influence the strength level of reception of the message by a base station, so that the geographical position of the terminal thus estimated is not always very precise.

The geographical position of the terminal can also be estimated, in particular, by comparing the Times of Arrival (or TOA) of the message on each of the base stations. However, it is then necessary to synchronise the base stations in time with each other, and the precision of the estimation of the geographical position depends on the precision with which the base stations are synchronised in time with each other. For applications of the IoT and/or M2M type, it is generally not desirable to implement a fine time synchronisation of the base stations with each other because this would increase the complexity and the cost of manufacturing the access network.

OBJECT AND SUMMARY OF THE INVENTION

The purpose of the present invention is to overcome all or part of the disadvantages of the prior art, in particular those set out above, by proposing a solution which allows to precisely determine the geographical position of a terminal of a wireless communication system.

Furthermore, the present invention also aims at providing a solution which allows, in some implementations, to limit the amount of data exchanged between the terminal and an access network of the wireless communication system.

To this end, and according to a first aspect, the invention relates to a method for geolocating a terminal of a wireless communication system, the terminal being adapted to exchange messages with an access network of said wireless communication system according to a first wireless communication protocol, said method including:
  receiving, by the terminal, a message transmitted according to a second wireless communication protocol by a transmitting device of interest,
  obtaining an ambiguous item of identification information from the transmitting device of interest,
  transmitting, by the terminal and to the access network, a message including the ambiguous item of identification information of the transmitting device of interest,
  estimating, by the access network, an approximate geographical position of the terminal,
  identifying, in a table storing a list of transmitting device identifiers and the respective geographical positions of said transmitting devices, the transmitting device of interest as being the transmitting device in the table whose identifier corresponds to the ambiguous item of identification information and whose geographical position corresponds to the approximate geographical position of the terminal,
  estimating the precise geographical position of said terminal based on the geographical position of the transmitting device of interest.

Thus, the access network successively determines a first estimate of the geographical position of the terminal, called "approximate geographical position", and a second estimate of said geographical position, called "precise geographical position". "Precise" and "approximate" mean simply that the precision of the precise geographical position is in principle better than that of the approximate geographical position.

To estimate the precise geographical position of the terminal, the access network uses the fact that the terminal is also capable of receiving messages from at least one transmitting device of interest whose geographical position is predetermined and stored in a table including a list of transmitting devices and their respective geographical positions.

The terminal, which receives a message transmitted by the transmitting device of interest, transmits to the access network a message including an item of identification information of said transmitting device of interest.

However, this identification information is ambiguous in that it is likely to correspond to several transmitting devices whose geographical positions are stored in the table. This is the case, for example, if the transmitting device of interest uses a local identifier, that is to say one that can be used by different transmitting devices located in different places. But this can also be the case, in particular, if the transmitting device of interest uses a global identifier (that is to say an unambiguous identifier which uniquely identifies said transmitting device of interest) but the ambiguous item of identification information only partially incorporates the global identifier of said transmitting device of interest, for example to reduce the amount of data to be transmitted to the access network.

To remove the ambiguity on the identity of the transmitting device of interest, the access network estimates the approximate geographical position of the terminal, for example based on RSSI measurements, TOA measurements, etc., on messages received from said terminal. Since the transmitting device of interest is located in the vicinity of the terminal, the approximate geographical position of the terminal can be considered representative of the approximate geographical position of said transmitting device of interest, and can therefore be used to remove the ambiguity on the identity of the transmitting device of interest. Indeed, even if two transmitting devices (or more) of the table may correspond to the same ambiguous item of identification information, said transmitting devices will generally have very different stored geographical positions, so that the transmitting device of interest can be identified, among the transmitting devices of the table corresponding to the ambiguous item of identification information, as being the one whose stored geographical position corresponds to the approximate geographical position of the terminal/transmitting device of interest.

Knowledge of the geographical position of the transmitting device of interest, which is in the vicinity of the terminal, can be used to improve the precision of the estimation of the geographical position of said terminal relative to the approximate geographical position. If the range of the second wireless communication protocol is less than the range of the first wireless communication protocol, then the precise geographical position of said terminal corresponds, for example, directly to the geographical position of the transmitting device of interest.

In particular implementations, the geolocation method may further include one or more of the following features, taken alone or in any technically possible combination.

In particular embodiments, the message received from said transmitting device of interest includes an ambiguous identifier of said transmitting device of interest, and the ambiguous item of identification information corresponds to said identifier.

In particular implementations, the message received from said transmitting device of interest includes an identifier of said transmitting device of interest, and obtaining the ambiguous item of identification information includes a lossy compression of the identifier included in the message received from the transmitting device of interest.

Such arrangements are advantageous in that they allow, thanks to a lossy compression, to reduce the amount of data necessary to transmit an ambiguous item of identification information. This is particularly advantageous, in particular, for IoT or M2M type applications, since the amount of data that can be included in a message can be limited. Furthermore, this can also allow to include, in the same message, ambiguous items of identification information for several transmitting devices of interest and/or to include in said message other items of information such as, for example, an information item representative of a reception strength level of the message received from a transmitting device of interest, etc.

Due to the lossy compression, the identifier may be made ambiguous (when initially unambiguous) or made even more ambiguous (when initially ambiguous). However, as before, taking into account the approximate geographical position of the terminal allows in principle to remove the ambiguity on the identity of the transmitting device of interest.

In particular implementations, several transmitting devices of interest are used, and the precise geographical position of said terminal is estimated based on the respective geographical positions of said transmitting devices of interest.

In particular implementations, the ambiguous items of identification information of at least two transmitting devices of interest are transmitted to the access network in the same message according to the first wireless communication protocol.

In particular implementations, the second wireless communication protocol has a lower range than the range of the first wireless communication protocol.

In particular implementations, the approximate geographical position of the terminal is estimated based on at least one message received by at least one base station of the access network, said base station being of predetermined geographical position.

In particular implementations, the estimation of the approximate geographical position of the terminal is performed by the access network without any explicit item of information contributing to this estimation being sent by the terminal in a message to the access network. This is understood to mean that the terminal does not transmit a message to the access network the binary data of which includes an information item allowing to estimate a geographical position of the terminal.

Such arrangements again allow to limit the amount of data exchanged between a terminal and the access network in order to geolocate the terminal. For example, the access network can estimate the approximate geographical position of the terminal from metadata associated with one or more messages from the terminal that do not contain an information item on the geographical position of the terminal. The metadata can for example correspond to a strength level for a message received by a base station of the access network, to an identifier of a base station having received a message from the terminal, to measurements of time of arrival differences of the same message at different base stations, etc. Different methods can then be used to estimate the approximate geographical position of the terminal, such as multilateration based on RSSI levels or based on time of arrival differences, for example. Methods implementing machine learning algorithms exploiting metadata can also be implemented.

In particular implementations, the first wireless communication protocol is a wireless wide area network communication protocol.

In particular implementations, the second wireless communication protocol is a wireless local area network or wireless personal area network communication protocol.

According to a second aspect, the invention relates to a terminal of a wireless communication system, said terminal including a first communication module adapted to exchange messages with an access network of the wireless communication system according to a first wireless communication protocol, and a second communication module adapted to receive messages according to a second wireless communication protocol. Said terminal is configured for:
receiving, by the second communication module, a message transmitted by a transmitting device of interest,
obtaining, by a processing circuit of the terminal, an ambiguous item of identification information of said transmitting device of interest,
transmitting, by the first communication module, a message including the ambiguous item of identification information of said transmitting device of interest.

In particular embodiments, the terminal may further include one or more of the following features, taken alone or in any technically possible combination.

In particular embodiments, the processing circuit is configured to obtain the ambiguous item of identification information of the transmitting device of interest from an identifier of said transmitting device of interest included in the message received from said transmitting device of interest.

In particular embodiments, the processing circuit is configured to obtain the ambiguous item of identification information of the transmitting device of interest by lossy compression of the identifier of said transmitting device of interest.

According to a third aspect, the invention relates to an access network of a wireless communication system, said access network being adapted to exchange messages with a terminal, said access network being configured for:
- receiving a message transmitted by the terminal, said message including an ambiguous item of identification information of a transmitting device of interest in the vicinity of said terminal,
- estimating an approximate geographical position of the terminal,
- identifying, in a table storing a list of transmitting device identifiers and the respective geographical positions of said transmitting devices, the transmitting device of interest as being the transmitting device in the table whose identifier corresponds to the ambiguous item of identification information and whose geographical position corresponds to the approximate geographical position of the terminal,
- estimating the precise geographical position of said terminal based on the geographical position of the transmitting device of interest.

In particular embodiments, the access network may further include one or more of the following features, taken alone or in any technically possible combination.

In particular embodiments, the table being stored in a geolocation server external to said access network, said access network includes an enquiry server configured for:
- transmitting a request for the geographical position of the transmitting device of interest to said geolocation server, said request for a geographical position including the ambiguous item of identification information of the transmitting device of interest and the approximate geographical position of the terminal,
- receiving from said geolocation server a response including the geographical position of said transmitting device of interest.

In particular embodiments, the table being stored in a geolocation server external to said access network, said access network includes an enquiry server configured for:
- transmitting a request for the geographical position of the transmitting device of interest to said geolocation server, said request for a geographical position including the ambiguous item of identification information of the transmitting device of interest,
- receiving from said geolocation server a response including the geographical positions of the transmitting devices whose identifiers correspond to the ambiguous item of identification information, said access network being configured to identify the geographical position of the transmitting device of interest as being the received geographical position corresponding to the approximate geographical position of the terminal.

According to a fourth aspect, the invention relates to a wireless communication system comprising a terminal according to any one of the embodiments of the invention and an access network according to any one of the embodiments of the invention.

According to a fifth aspect, the invention relates to a geolocation server including storage means wherein is stored a table including a list of transmitting device identifiers and the respective geographical positions of said transmitting devices, said geolocation server further including means configured for:
- receiving a request for the geographical position of a transmitting device of interest, said request for a geographical position including an ambiguous item of identification information of the transmitting device of interest and an approximate geographical position,
- identifying a transmitting device in the table whose stored identifier corresponds to the received ambiguous item of identification information and whose geographical position corresponds to the received approximate geographical position,
- transmitting a response including the geographical position of the transmitting device identified in the table.

BRIEF DESCRIPTION OF THE FIGURES

The invention will be better understood upon reading the following description, given by way of non-limiting example, and made with reference to the figures which represent.

In these figures, identical references from one figure to another designate identical or similar elements. For reasons of clarity, the elements shown are not to scale, unless stated otherwise.

DETAILED DESCRIPTION OF EMBODIMENTS

Figure 1:
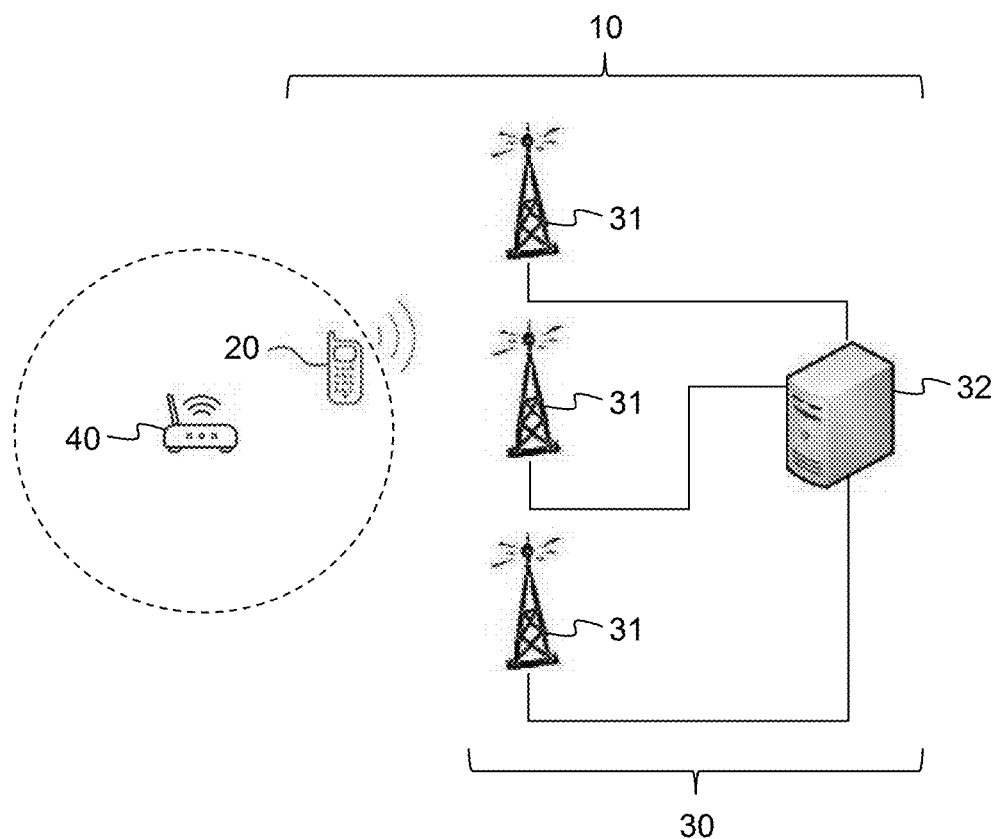
FIG. 1: a schematic representation of an exemplary embodiment of a wireless communication system.

FIG. 1 schematically shows a wireless communication system 10, including at least one terminal 20 and an access network 30 including several base stations 31.

The terminal 20 is adapted to transmit messages on an uplink to the access network 30. Each base station 31 is adapted to receive messages from the terminal 20 when said terminal is in its range. Each message thus received is for example transmitted to a server 32 of the access network 30, possibly accompanied by other information items such as an identifier of the base station 31 which received it, the reception strength level of said received message, the time of arrival of said message, etc. The server 32 processes, for example, all the messages received from the different base stations 31.

The wireless communication system 10 can be unidirectional, that is to say it only allows message exchanges on the uplink from the terminal 20 to the access network 30. However, depending on other examples, nothing excludes allowing bidirectional exchanges. Where appropriate, the access network 30 is also adapted to transmit, via the base stations 31, messages on a downlink to the terminal 20, which is adapted to receive them.

The exchanges of messages on the uplink uses a first wireless communication protocol.

In particular embodiments, the first wireless communication protocol is a Wireless Wide Area Network (or WWAN) communication protocol. For example, the first wireless communication protocol is a standardised communication protocol of the UMTS ("Universal Mobile Telecommunications System"), LTE ("Long Term Evolution), LTE-Advanced Pro, 5G type, etc. Alternatively, the first wireless communication protocol is for example an ultra-narrow band proprietary communication protocol. "Ultra Narrow Band" (or UNB) means that the instantaneous frequency spectrum of the radio signals transmitted by the terminals is of frequency width less than two kilohertz, or even less than one kilohertz.

As illustrated by FIG. 1, the terminal 20 is also adapted to receive messages transmitted by at least one transmitting device of interest 40, which is located in the vicinity of said terminal 20. The messages transmitted by the transmitting device of interest 40 use a second wireless communication protocol, different from the first wireless communication protocol. Note that the transmitting device of interest 40 may be entirely independent of the wireless communication system 10, and does not need to support the first wireless communication protocol.

The geographical position of the transmitting device of interest 40 is predetermined and stored in a table including a list of identifiers of different transmitting devices, and the respective geographical positions of said transmitting devices.

In preferred embodiments, the second wireless communication protocol has a lower range than the range of the first wireless communication protocol. In such a case, the geographical position of the transmitting device of interest 40, in the range of which the terminal 20 is located, provides a more precise information item on the geographical position of the terminal 20 than, for example, the geographical position of a base station 31 which receives a message transmitted by the terminal 20. In the case where the first wireless communication protocol is a wireless wide area network communication protocol, the second wireless communication protocol is for example a Wireless Local Area Network (or WLAN) communication protocol, for example of the WI-FI® type (IEEE 802.11 standards), etc., or else a Wireless Personal Area Network (or WPAN) communication protocol, for example BLUETOOTH® type, etc.

It should be noted, however, that it is also possible, according to other examples, to have a second wireless communication protocol whose range is not less than that of the first wireless communication protocol. Where appropriate, it is possible to consider the transmitting device of interest 40 as being an additional equipment item in the range of which the terminal 20 is located, which can allow to improve the precision of the estimation of the geographical position of the terminal 20 by taking into account the position of the transmitting device of interest 40 in addition to the geographical positions of the base stations 31 of the access network 30.

Figure 2:
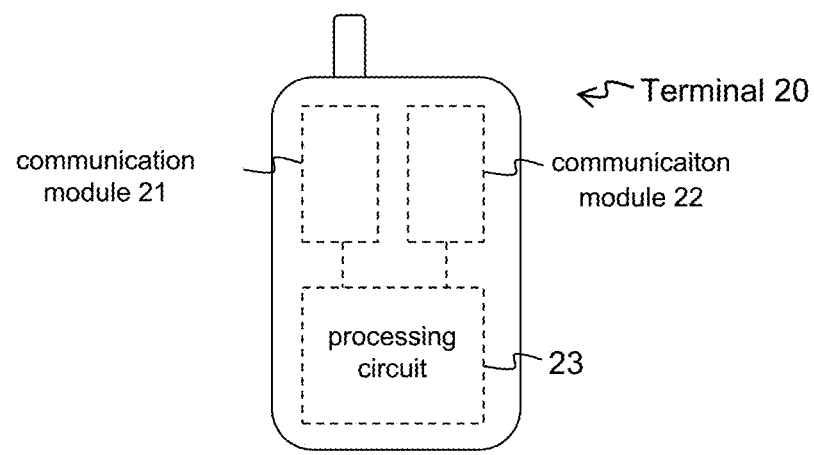
FIG. 2: a schematic representation of an exemplary embodiment of a terminal.

FIG. 2 schematically shows an embodiment of a terminal 20.

As illustrated in FIG. 2, the terminal 20 includes a first communication module 21 adapted to exchange messages with the base stations 31 according to the first wireless communication protocol. The first communication module 21 is for example in the form of a radio circuit including equipment items (antenna, amplifier, local oscillator, mixer, analogue filter, etc.).

The terminal 20 also includes a second communication module 22 adapted to receive messages transmitted by the transmitting device of interest 40, according to the second wireless communication protocol. The second communication module 22 is for example in the form of an electric radio circuit including equipment (antenna, amplifier, local oscillator, mixer, analogue filter, etc.).

Furthermore, the terminal 20 also includes a processing circuit 23, connected to the first communication module 21 and to the second communication module 22. The processing circuit 23 includes for example one or more processors and storage means (magnetic hard disk, electronic memory, optical disc, etc.) wherein a computer program product is stored, in the form of a set of program code instructions to be executed in order to implement some steps of a geolocation method 60 described below. Alternatively or in addition, the processing circuit 23 includes one or more programmable logic circuits (FPGA, PLD, etc.), and/or one or more specialised integrated circuits (ASIC, etc.), and/or a set of discrete electronic components, etc.

In other words, the processing circuit 23 includes a set of software (specific computer program product) and/or hardware (FPGA, PLD, ASIC, discrete electronic components, etc.) configured means, to implement, in collaboration with the first communication module 21 and the second communication module 22, some steps of the geolocation method 60 described below.

Figure 3:
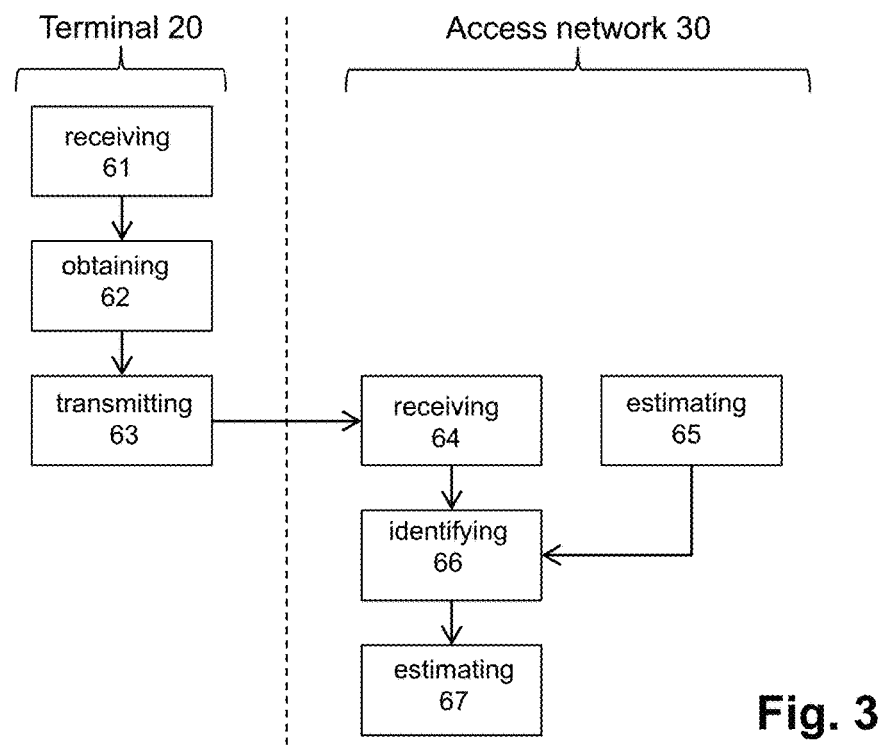
FIG. 3: a diagram illustrating the main steps of a geolocation method.

FIG. 3 schematically shows the main steps of a method 60 for geolocating the terminal 20, which are:
- a step 61 of receiving, by the terminal 20, a message transmitted according to a second wireless communication protocol by the transmitting device of interest 40,
- a step 62 of obtaining an ambiguous item of identification information from the transmitting device of interest,
- a step 63 of transmitting, by the terminal 20 and to the access network 30, a message including the ambiguous item of identification information of the transmitting device of interest 40,
- a step 64 of receiving the message including the ambiguous item of identification information by the access network 30,
- a step 65 of estimating, by the access network 30, an approximate geographical position of the terminal 20,
- a step 66 of identifying, based on the approximate geographical position and of the ambiguous item of identification information, the transmitting device of interest 40 in a table storing a list of transmitting device identifiers and the respective geographical positions of said transmitting devices,
- a step 67 of estimating the precise geographical position of said terminal 20 based on the geographical position of the transmitting device identified in the table as being the transmitting device of interest 40.

It should be noted that the arrangement of the steps illustrated by FIG. 3 is mainly illustrative, and is not necessarily representative of the temporal order of execution of said steps. In particular, the step 65 of estimating the approximate geographical position of the terminal 20 can be executed independently of the steps 61 of receiving the message transmitted by the transmitting device of interest 40, 62 of obtaining the ambiguous item of identification information and 63 of transmission executed by the terminal 20.

The steps 64 of receiving the message transmitted by the terminal 20, 65 of estimating the approximate geographical position of the terminal 20, 66 of identifying the transmitting device of interest 40 and 67 of estimating the precise geographical position of said terminal 20 are executed by the access network 30, that is to say by one or more base stations 31 and/or by the server 32. During some of these steps, the access network 30 may optionally involve equipment items which are external to said access network 30, and can in particular enquire a remote geolocation server 50, external to said access network 30, storing the table.

In the remainder of the description, the case where the steps executed by the access network 30, with the exception of the reception step 64, are all implemented by the server 32 which receives from the base stations 31 the messages received from the terminal 20, is considered in a non-limiting manner.

To this end, the base stations 31 and the server 32 include respective network communication means, considered to be known to the person skilled in the art, allowing the base stations 31 to transmit each received message to the server 32.

The server 32 includes for example one or more processors and storage means (magnetic hard disk, electronic memory, optical disc, etc.) wherein a computer program product is stored, in the form of a set of program code instructions to be executed to implement said steps of the geolocation method 60. Alternatively or in addition, the server 32 includes one or more programmable logic circuits (FPGA, PLD, etc.), and/or one or more specialised integrated circuits (ASIC), and/or a set of discrete electronic components, etc., adapted to implement all or part of said steps of the geolocation method 60.

In other words, the server 32 includes a set of software (specific computer program product) and/or hardware (FPGA, PLD, ASIC, discrete electronic components, etc.) configured means, to implement said steps of the geolocation method 60.

Non-limiting examples of the implementation of the various steps illustrated in FIG. 3 are now described.

During the reception step 61, the second communication module 22 of the terminal 20 receives a message transmitted by the transmitting device of interest 40. The transmitting device of interest 40 is for example a Wi-Fi access point or a Bluetooth access point, etc., in the range of which said terminal 20 is located.

During step 62, the processing circuit 23 of the terminal 20 obtains, preferably from the message received from the transmitting device of interest 40, an ambiguous item of identification information of said transmitting device of interest 40. "Ambiguous item of identification information", means that the latter is likely to correspond to several transmitting devices whose geographical positions are stored in the table. In other words, the use of this single ambiguous item of identification information does not allow to know with certainty which transmitting device in the table corresponds to the transmitting device of interest 40.

In general, the message transmitted by the transmitting device of interest 40 includes an identifier of said transmitting device of interest. This identifier can be local, that is to say an identifier that can be used by different transmitting devices located in different locations, or else a global identifier (that is to say an unambiguous identifier that identifies one-to-one, said transmitting device of interest).

For example, if the transmitting device of interest 40 is a Wi-Fi access point, it has a MAC ("Medium Access Control") address which corresponds to a global identifier used only by this transmitting device of interest 40 and by any other transmitting device. The transmitting device of interest 40 also has an SSID ("Service Set Identifier") which is a generally local identifier, which can be reused by another transmitting device at a different location.

According to a first example, the terminal 20 extracts a local identifier from the message received from the transmitting device of interest 40, for example an SSID. Such a local identifier is by construction already ambiguous, and can be used as such as an ambiguous item of identification information. The obtaining step 62 can then consist in extracting the local identifier from the received message, the ambiguous item of identification information being directly equal to this local identifier. However, it is also possible, according to other examples, to obtain the ambiguous item of identification information by modifying said local identifier by means of a predetermined function, allowing for example to reduce the amount of data to be transmitted.

According to another example, the terminal 20 extracts a global identifier from the message received from the transmitting device of interest 40, for example a MAC address. Such a global identifier is not ambiguous but represents an amount of data which may be too large to transmit to the access network 30, in particular for applications of the IoT or M2M type. The main purpose of transforming the global identifier into an ambiguous item of identification information in this case is to reduce the amount of data to be transmitted, and the ambiguity is the result of this reduction in the amount of data. The obtaining step 62 then includes extracting said global identifier from the received message, and modifying said global identifier by means of a predetermined function aiming at reducing the amount of data of said global identifier. This modification corresponds, for example, to a lossy compression, that is to say that it is not possible, from the only ambiguous item of identification information obtained, to find the global identifier. In general, any known method of lossy compression can be implemented, and the choice of a particular method constitutes only a variant implementation of the invention. For example, if the global identifier is in the form of a sequence of bits, the lossy compression corresponds to the removal of some bits of said global identifier. In the case of a MAC address, consisting of 48 or 64 bits, the lossy compression can consist in removing some most significant bits, for example the most significant 16 bits, or else the most significant 24 bits. According to another example, the lossy compression can be performed, alternatively or in addition to the removal of some bits, by means of a cryptographic hash function (for example an MD5 or SHA-1 function).

Thus, depending on the case, the ambiguous item of identification information can correspond directly to the identifier extracted from the message received from the transmitting device of interest 40 (if this identifier is in turn ambiguous) or can be obtained by applying a predetermined function to said extracted identifier, this predetermined function preferably aiming at reducing the amount of data necessary to transmit the ambiguous item of identification information.

During the transmission step 63, the first communication module 21 of the terminal 20 transmits, to the access network 30, a message including the ambiguous item of identification information. This message is received, during step 64, by one or more base stations 31 of the access network 30.

Note that another advantage related to the use of an ambiguous item of identification information is that it adds confidentiality to the transmitted data. Indeed, the ambiguous item of identification information does not alone allow to know with certainty which transmitting device is located in the vicinity of the terminal 20, and therefore does not alone allow to determine the position of said terminal 20. Thus, if the message is intercepted by a malicious entity, this malicious entity would not be able to determine the position of the terminal 20 from only the content of the intercepted message. This is particularly the case, in particular, when the ambiguous item of identification information is obtained by lossy compression of a global identifier of the transmitting device of interest 40.

During step 65, the access network 30 estimates the geographical position called approximate geographical position of said terminal 20. It should be noted that, "approximate" means only that the precision of the estimated approximate geographical position is in principle less than the precision of the geographical position called precise geographical position which is estimated during step 67.

In the example considered, the access network 30 is configured to estimate the approximate geographical position of the terminal 20 based on messages received from said terminal 20. In preferred implementations, the approximate geographical position is estimated from the received message including the ambiguous item of identification information. However, according to other examples, nothing excludes estimating the approximate geographical position of said terminal 20 from messages transmitted by said terminal 20 other than said message including the ambiguous item of identification information.

In general, any method for estimating the approximate geographical position can be implemented, and the choice of a particular method constitutes only an alternative implementation of the invention. For example, the access network 30 can estimate the approximate geographical position of the terminal 20 as being the geographical position of a base station 31 which has received a message transmitted by the terminal 20. If several base stations 31 can receive a message transmitted by the terminal 20, it is possible to estimate the approximate geographical position of the terminal 20 based on the geographical positions of all the base stations 31 which have received the message transmitted by the terminal 20 (for example by defining a barycentre of these geographical positions).

According to another example, the access network 30 can estimate the distances which separate the terminal 20 from one or more base stations 31 by calculating the time of propagation of a message transmitted by the terminal 20 to the base stations 31 from the TOA measurements or from measurements of Time Differences of Arrival (or TDOA) of this message at the different base stations 31. It is then possible to estimate the position of the terminal 20 by multilateration if the geographical positions of the base stations 31 are known.

According to another example, it is possible to estimate the position of the terminal 20 by multilateration by determining the distances which separate the terminal 20 from several base stations 31 from an RSSI measurement for each base station 31 for a message transmitted by the terminal 20 to the access network 30.

According to yet another example, the method for estimating an approximate geographical position of the terminal 20 by the access network 30 can be based on Machine Learning techniques which combine a fingerprint at a geographical position of the considered geographical area. Such a method is based on the assumption that a strength level of a reception by a base station 31 for a message transmitted by the terminal 20 located at a given geographical position is stable over time. Concretely, it is about constructing, during a first phase of calibration, a database which associates with known geographical positions a "radio signature" corresponding to the set of RSSI measurements obtained for a terminal 20 at the considered geographical position for a set of base stations 31. Then, during a search phase, a radio signature observed for the terminal 20 whose approximate geographical position is sought to be estimated is compared with all the radio signatures of the database in order to estimate the approximate geographical position of the terminal 20 from the geographical position(s) corresponding to the radio signature(s) most similar to the radio signature of the terminal 20.

In preferred embodiments, the estimation of the approximate geographical position of the terminal is performed by the access network without any explicit information contributing to this estimation being sent by the terminal in a message to the access network (in other words, the terminal does not transmit to the access network a message whose binary data includes an information item allowing to estimate a geographical position of the terminal). Such arrangements allow to limit the amount of data exchanged between the terminal and the access network in order to implement the geolocation method according to the invention.

Since the transmitting device of interest 40 is located in the vicinity of the terminal 20, the approximate geographical position of the terminal 20 also corresponds to the approximate geographical position of the transmitting device of interest 40 (in the range of the second wireless communication protocol).

During the identification step 66, the approximate geographical position of the terminal 20 and the ambiguous item of identification information of the transmitting device of interest 40 are used to search for said transmitting device of interest 40 among the transmitting devices whose geographical positions are stored in the table.

Generally, the transmitting device of interest 40 is the transmitting device in the table whose identifier corresponds to the received ambiguous item of identification information and whose geographical position corresponds to the received approximate geographical position. Thus, the identification step 66 includes comparing the ambiguous item of identification information with identifiers stored in the table and comparing the approximate geographical position with geographical positions stored in said table.

It should be noted that the identifiers stored in the table can be those that the transmitting devices incorporate in the messages that they transmit or, when the ambiguous item of identification information is obtained by applying a predetermined function (removal of bits, cryptographic hash function, etc.), the result of this predetermined function. For example, in the case of a MAC address, then the identifier stored in the table is for example either the complete MAC address or the result of the predetermined function applied to said MAC address. In the event that the complete MAC address is stored, then the comparison with the ambiguous item of identification information requires the predetermined function to be applied to the stored MAC address beforehand. In the case where the identifier stored in the table corresponds to the result of the predetermined function applied to the complete MAC address, said identifier can be directly compared with the received ambiguous item of identification information.

For example, it is possible, in a non-limiting manner, to firstly identify all the transmitting devices of the table whose stored identifiers correspond to the ambiguous item of identification information of the transmitting device of interest 40. Secondly, the geographical positions of the transmitting devices whose stored identifiers correspond to the ambiguous item of identification information are compared with the approximate geographical position of the terminal 20/transmitting device of interest 40. The transmitting device of interest 40 is considered as the stored transmitting device, among those whose identifier corresponds to the ambiguous item of identification information, whose stored geographical position is closest to the approximate geographical position.

The table is for example stored in an equipment item of the access network 30, for example in the server 32. In such a case, the identification step 66 can be entirely executed by the access network 30, without involving an external equipment item.

Alternatively, the table can be stored in a geolocation server 50 external to the access network 30. In such a case, the access network 30 can include an enquiry server, which can be the server 32 or a separate equipment item, configured to remotely enquire the geolocation server 50.

Figure 4:
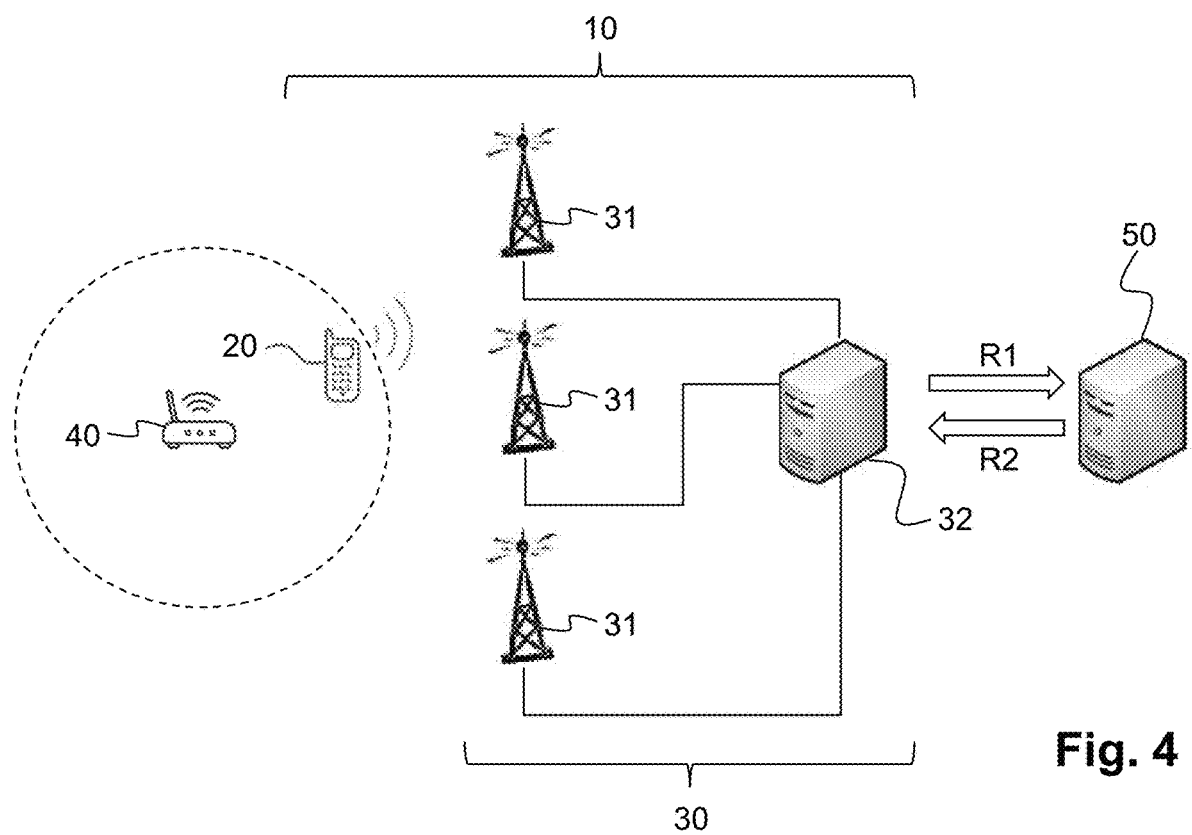
FIG. 4: a schematic representation of a communication system including an access network which enquires a remote geolocation server.

FIG. 4 schematically shows an exemplary embodiment wherein the table is stored in a geolocation server 50 external to said access network 30, which is enquired remotely by an enquiry server. In the non-limiting example illustrated in FIG. 4, the enquiry server corresponds to the server 32 of FIG. 1.

As illustrated by FIG. 4, the server 32 transmits a request R1 for the geographical position of the transmitting device of interest 40 to said geolocation server 50.

The request R1 for the geographical position includes at least the ambiguous item of identification information of the transmitting device of interest 40 and, preferably, the approximate geographical position of the terminal 20. In this case, the geolocation server 50 directly identifies the transmitting device in the table which corresponds to the transmitting device of interest, and sends to the server a response R2 including the geographical position of said transmitting device identified as being the transmitting device of interest 40.

In another example, the request R1 for the geographical position does not include the approximate geographical position of the terminal 20. In such a case, the geolocation server 50 identifies all the transmitting devices of the table whose identifiers correspond to the ambiguous item of identification information, and sends in the response R2 the geographical positions of all the transmitting devices likely to correspond to the transmitting device of interest 40. It is then the access network 30, for example the server 32, which compares the geographical positions received in the response R2 with the approximate geographical position. The received geographical position which is closest to the approximate geographical position is considered to be the geographical position of the transmitting device of interest 40.

The geolocation server 50 includes, for example, one or more processors and storage means (magnetic hard disk, electronic memory, optical disk, etc.) wherein the table and a computer program product are stored, in the form of a set of program code instructions to be executed to process the requests R1 for geographical positions. Alternatively or in addition, the geolocation server 50 includes one or more programmable logic circuits (FPGA, PLD, etc.), and/or one or more specialised integrated circuits (ASIC, etc.), and/or a set of discrete electronic components, etc.

In other words, the geolocation server 50 includes a set of software (specific computer program product) and/or hardware (FPGA, PLD, ASIC, discrete electronic components, etc.) configured means, to process the requests R1 for geographical positions of transmitting devices of interest 40.

In step 67, the access network 30 estimates the precise geographical position of the terminal 20 from the geographical position of the transmitting device of interest obtained from the table.

For example, the precise geographical position of the terminal 20 is chosen equal to the received geographical position for the transmitting device of interest 40. However, it is also possible, according to other examples, to implement other estimation methods.

In particular, it is possible to consider several transmitting devices of interest which may be of the same type (for example only Wi-Fi access points) or of different types (for example Wi-Fi access points and Bluetooth access points). In such a case, the terminal 20 receives a message from each of these transmitting devices of interest 40 and obtains an ambiguous item of identification information for each of these transmitting devices of interest 40. The ambiguous items of identification information are transmitted to the access network 30, preferably minimising the number of messages for this purpose. In particular, the advantage of reducing the amount of data by applying lossy compression also resides in the fact that it may then be possible to transmit several ambiguous items of identification information in the same message, which allows in particular to reduce the power consumption of the terminal 20. Then, the geographical positions of the transmitting devices of interest 40 are identified in the table, and the precise geographical position of the terminal 20 can be estimated from the geographical positions of the transmitting devices of interest 40, by implementing for example methods described with reference to step 65 of estimating the approximate geographical position of the terminal 20. In particular, the terminal 20 can perform RSSI measurements on the messages received from the transmitting devices of interest 40 and transmit information items representative of these RSSI measurements to the access network 30 which can then use them to estimate the geographical position of the terminal 20.

The invention claimed is:

1. A method for geolocating a terminal of a wireless communication system, the terminal being configured to exchange messages with an access network of the wireless communication system according to a first wireless communication protocol, the method comprising:
   receiving, by the terminal, a message transmitted according to a second wireless communication protocol by a transmitting device of interest;
   obtaining an ambiguous item of identification information from the transmitting device of interest;
   transmitting, by the terminal and to the access network, a message comprising the ambiguous item of identification information of the transmitting device of interest wherein the message does not include any other binary data allowing to estimate a geographical position of the terminal;
   estimating, by the access network, an approximate geographical position of the terminal;
   identifying, by the access network, in a table storing a list of transmitting device identifiers and respective geographical positions of transmitting devices, the transmitting device of interest being a transmitting device in the table whose identifier corresponds to the ambiguous item of identification information and whose geographical position corresponds to the approximate geographical position of the terminal; and estimating, by the access network, a precise geographical position of the terminal based on a geographical position of the transmitting device of interest.

2. The method of claim 1, wherein the message received from the transmitting device of interest comprises an ambiguous identifier of the transmitting device of interest, and wherein the ambiguous item of identification information corresponds to the ambiguous identifier.

3. The method of claim 1, wherein the message received from the transmitting device of interest comprises an identifier of the transmitting device of interest; and wherein obtainment of the ambiguous item of identification information comprises a lossy compression of the identifier.

4. The method of claim 1, wherein a plurality of transmitting devices of interest are used, the precise geographical position of the terminal being estimated based on the respective geographical positions of the plurality of transmitting devices of interest.

5. The method of claim 4, wherein ambiguous items of identification information of at least two transmitting devices of interest are transmitted to the access network, in the same message according to the first wireless communication protocol.

6. The method of claim 1, wherein a range of the second wireless communication protocol is less than a range of the first wireless communication protocol.

7. The method of claim 1, wherein the approximate geographical position of the terminal is estimated based on at least one message received by at least one base station of the access network, said at least one base station being located in a predetermined geographical position.

8. The method of claim 1, wherein the estimation of the approximate geographical position of the terminal is performed by the access network without using any explicit information in a message received by the access network from the terminal.

9. A terminal of a wireless communication system, the terminal comprising:
  a first communication module configured to exchange messages with an access network of the wireless communication system according to a first wireless communication protocol;
  a second communication module configured to receive messages according to a second wireless communication protocol; and
  wherein the terminal configured to:
    receive, by the second communication module, a message transmitted by a transmitting device of interest;
    obtain, by a processing circuit of the terminal, an ambiguous item of identification information of the transmitting device of interest; and
    transmit, by the first communication module, a message comprising the ambiguous item of identification information of the transmitting device of interest, wherein the message does not include any other binary data allowing to estimate a geographical position of the terminal.

10. The terminal of claim 9, wherein the processing circuit is configured to obtain the ambiguous item of identification information of the transmitting device of interest from an identifier of the transmitting device of interest included in the message received from the transmitting device of interest.

11. The terminal of claim 10, wherein the processing circuit is configured to obtain the ambiguous item of identification information of the transmitting device of interest by lossy compression of the identifier of the transmitting device of interest.

12. An access network of a wireless communication system, the access network being configured to exchange messages with a terminal, wherein the access network is configured to:
  receive a message transmitted by the terminal, the message comprising an ambiguous item of identification information of a transmitting device of interest in the vicinity of the terminal, wherein the message does not include any other binary data allowing to estimate a geographical position of the terminal;
  estimate an approximate geographical position of the terminal;
  identify, in a table storing a list of transmitting device identifiers and respective geographical positions of transmitting devices, the transmitting device of interest as being a transmitting device in the table whose identifier corresponds to the ambiguous item of identification information and whose geographical position corresponds to the approximate geographical position of the terminal; and
  estimating a precise geographical position of the terminal based on a geographical position of the transmitting device of interest.

13. The access network of claim 12, wherein, the table being stored in a geolocation server external to the access network, the access network comprises an enquiry server configured to:
  transmit a request for the geographical position of the transmitting device of interest to the geolocation server, the request for the geographical position comprising the ambiguous item of identification information of the transmitting device of interest and the approximate geographical position of the terminal; and
  receive from the geolocation server a response comprising the geographical position of the transmitting device of interest.

14. The access network of claim 13, wherein each of the geolocation server and the enquiry server comprises one or more processors, or one or more programmable logic circuits.

15. The access network of claim 12, wherein, the table being stored in a geolocation server external to the access network, the access network comprises an enquiry server configured to:
  transmit a request for the geographical position of the transmitting device of interest to the geolocation server, the request for the geographical position comprising the ambiguous item of identification information of the transmitting device of interest;
  receive from the geolocation server a response comprising geographical positions of the transmitting devices whose identifiers correspond to the ambiguous item of identification information; and
  wherein the access network being configured to identify the geographical position of the transmitting device of interest as being a received geographical position corresponding to the approximate geographical position of the terminal.

16. The access network of claim 15, wherein each of the geolocation server and the enquiry server comprises one or more processors, or one or more programmable logic circuits.

17. A wireless communication system comprising the access network of claim 12 and a terminal comprising:

a first communication module configured to exchange messages with the access network of the wireless communication system according to a first wireless communication protocol;

a second communication module configured to receive messages according to a second wireless communication protocol; and wherein the terminal configured to:

receive, by the second communication module, a message transmitted by the transmitting device of interest;

obtain, by a processing circuit of the terminal, the ambiguous item of identification information of the transmitting device of interest; and transmit, by the first communication module, the message comprising the ambiguous item of identification information of the transmitting device of interest, wherein the message does not include any other binary data allowing to estimate a geographical position of the terminal.

18. A processor-based geolocation server comprising a storage device to store a table, the table comprising a list of transmitting device identifiers and respective geographical positions of transmitting devices, the geolocation server being configured to:

receive a request for a geographical position of a transmitting device of interest, the request for a geographical position comprising an ambiguous item of identification information of the transmitting device of interest and an approximate geographical position;

identify a transmitting device in the table whose stored identifier corresponds to the ambiguous item of identification information of the transmitting device of interest and whose geographical position corresponds to the approximate geographical position; and transmit a response comprising the geographical position of the transmitting device identified in the table.

* * * * *